(12) United States Patent
Ueda et al.

(10) Patent No.: US 6,545,449 B2
(45) Date of Patent: Apr. 8, 2003

(54) METHOD FOR CONTROLLING CHARGE TO SECONDARY BATTERY FOR AUTOMATED GUIDED VEHICLE

(75) Inventors: Toshifumi Ueda, Toyohashi (JP); Nobuyasu Morishita, Toyohashi (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/119,620

(22) Filed: Apr. 9, 2002

(65) Prior Publication Data

US 2002/0145402 A1 Oct. 10, 2002

(30) Foreign Application Priority Data

Apr. 10, 2001 (JP) .......................................... 2001-111634

(51) Int. Cl.[7] .................................................. H02J 7/00
(52) U.S. Cl. ...................................... 320/132; 320/134
(58) Field of Search ................................ 320/132, 134, 320/136, 124, 125, 130; 340/636; 324/426

(56) References Cited

U.S. PATENT DOCUMENTS

| 5,627,451 A | 5/1997 | Takeda ........................ 320/151 |
| 5,773,956 A | 6/1998 | Wieczorek .................... 320/152 |
| 5,994,878 A | * 11/1999 | Ostergraad et al. .......... 320/132 |
| 6,198,254 B1 | * 3/2001 | Satake et al. ................ 320/132 |
| 2002/0033693 A1 | 3/2002 | Kohler ......................... 320/152 |

FOREIGN PATENT DOCUMENTS

| EP | 0 948 075 | 10/1999 |
| EP | 1 132 989 | 9/2001 |
| EP | 1 189 326 | 3/2002 |
| JP | 11-18315 A | 1/1999 |

* cited by examiner

*Primary Examiner*—Shawn Riley
*Assistant Examiner*—Lawrence Luk
(74) *Attorney, Agent, or Firm*—Merchant & Gould P.C.

(57) ABSTRACT

A method for controlling charge preventing an operation of a valve during charging and suppressing the false detection of the upper limit charging voltage due to the memory effect at the charge side in a secondary battery mounted on an automated guided vehicle is presented. The method includes charging the secondary battery at a charging current value of not less than 0.5 C and not more than 4.0 C; detecting current that flows in the secondary battery and calculating the remaining capacity by accumulating at least the detected current; and completing the charge to the secondary battery when the calculated remaining capacity is not less than the threshold value that is pre-set to not less than 60% and not more than 95%.

6 Claims, 8 Drawing Sheets

METHOD FOR CONTROLLING CHARGE TO SECONDARY BATTERY FOR AUTOMATED GUIDED VEHICLE

BACKGROUND OF THE INVENTION

1. Field of the Invention

The present invention relates to a method for controlling charge to a secondary battery such as a nickel-metal hydride secondary battery mounted on an automated guided vehicle.

2. Description of the Prior Art

Hitherto, an automated guided vehicle used for carrying goods in a factory, a warehouse, or the like, for the purpose of automation or laborsaving, includes a battery to be mounted as a power source of an electric motor for running and a drive source for load, and is controlled so as to run automatically on various running paths along a guide line such as a guide tape adhered to a floor of a factory, a warehouse, or the like.

When the battery is required to be charged or when no request to carry goods is made by an operation control station, the automated guided vehicle moves toward a charge station provided at the inner side etc. of the running path as a destination and is connected to a charger and the battery is charged at the charge station.

As the battery mounted on such an automated guided vehicle, conventionally a lead-acid battery was used. However, the lead-acid battery needs a long charging time, facilities for charging or replacing the battery, and staff to maintain the battery. For this reason, recently, instead of the lead-acid battery, an alkaline battery such as a nickel-metal hydride secondary battery, which is capable of rapid charge at the charge station and does not require the maintenance, has been used.

In such an alkaline battery for an automated guided vehicle, since the rapid charge for about a few minutes is carried out for the purpose of minimizing the stopping time at the charge station and improving the carrying efficiency, the charging rate is set to 0.5 C to 4.0 C, which is much larger than with that of an alkaline battery for an electric vehicle whose charging rate is low and charging time is long. Therefore, if the alkaline battery for an automated guided vehicle is charged until the remaining capacity (state-of-charge: SOC) reaches 100%, the internal pressure of the battery is increased, which may lead to such a problem that a relief valve is operated and gas leakage occurs.

Furthermore, in the alkaline battery for automated guided vehicles, since the range of the actually used SOC is a narrow range of a middle region, a memory effect by which the terminal voltage of the battery is lowered, generally occurring at the discharge side, occurs also at the charge side, and thus the terminal voltage is increased in the used middle region of SOC.

If such a phenomenon occurs, charge acceptability with respect to an alkaline battery is deteriorated, or the terminal voltage is increased, thereby resulting in a false detection that the terminal voltage reached a predetermined upper limit charging voltage.

SUMMARY OF THE INVENTION

With the foregoing in mind, it is an object of the present invention to provide a method for controlling charge to a secondary battery for an automated guided vehicle that prevents an operation of a valve during charging and suppresses a false detection of the upper limit charging voltage due to the memory effect at the charge side.

In order to achieve the above-mentioned object, a method for controlling charge to a secondary battery for an automated guided vehicle of the present invention is a method for controlling a charging amount of the secondary battery mounted on the automated guided vehicle and used as a power source of an electric motor for running the vehicle. The method includes charging the secondary battery at a charging current value of not less than 0.5 C and not more than 4.0 C; detecting current that flows in the secondary battery and calculating the remaining capacity by accumulating at least the detected current; and completing the charge to the secondary battery when the calculated remaining capacity is not less than the threshold value, which is pre-set to not less than 60%, and not more than 95%.

In this method for controlling charge to a secondary battery for an automated guided vehicle, it is preferable that the method includes detecting a temperature of the secondary battery; detecting an output voltage of the secondary battery; calculating a voltage gradient of the detected output voltage with respect to the time; and completing the charge to the secondary battery when, excluding the time right after the charge is started, the calculated voltage gradient is not less than a first threshold value corresponding to the detected temperature and the detected output voltage is not less than a second threshold value corresponding to the detected temperature.

It is preferable that the first threshold value and second threshold value are represented by a first functional equation and a second functional equation having variables of the detected temperature, respectively, and the first and second functional equations are determined in accordance with the intended set value of the remaining capacity at the time the charge is completed.

Furthermore, it is preferable that the first and second functional equations are determined respectively so that the first and second threshold values are reduced as the detected temperature is higher.

Furthermore, it is preferable that the first and second functional equations are determined in accordance with the charging current value.

In this case, it is preferable that the first and second functional equations are determined so that the first and second threshold values are increased as the charging current value is larger.

Furthermore, it is preferable that the first and second functional equations are expressed respectively by a linear equation.

Furthermore, it is preferable that the charge is considered complete upon satisfying at least one case selected from the group consisting of a case where the calculated remaining capacity is not less than the threshold value that is pre-set to be not less than 60% and the charging time reaches a predetermined period of time; a case where the detected temperature reaches a predetermined upper limit temperature; and a case where a temperature gradient of the detected temperature with respect to the time is calculated and the calculated temperature gradient reaches a predetermined value.

According to the above-mentioned method, it is possible to suppress the occurrence of the memory effect at the charge side and to resolve the false detection of the upper limit charging voltage, thus enabling an extremely stable charge control. Furthermore, by setting the remaining capacity (SOC) for completing the charge to be not more than 95%, the operation of the relief valve due to the increase of the internal pressure of the battery at the late-stage of charging can be suppressed.

DETAILED DESCRIPTION OF THE INVENTION

Hereinafter, preferable embodiments of the present invention will be explained with reference to drawings.

(First Embodiment)

Figure 1:
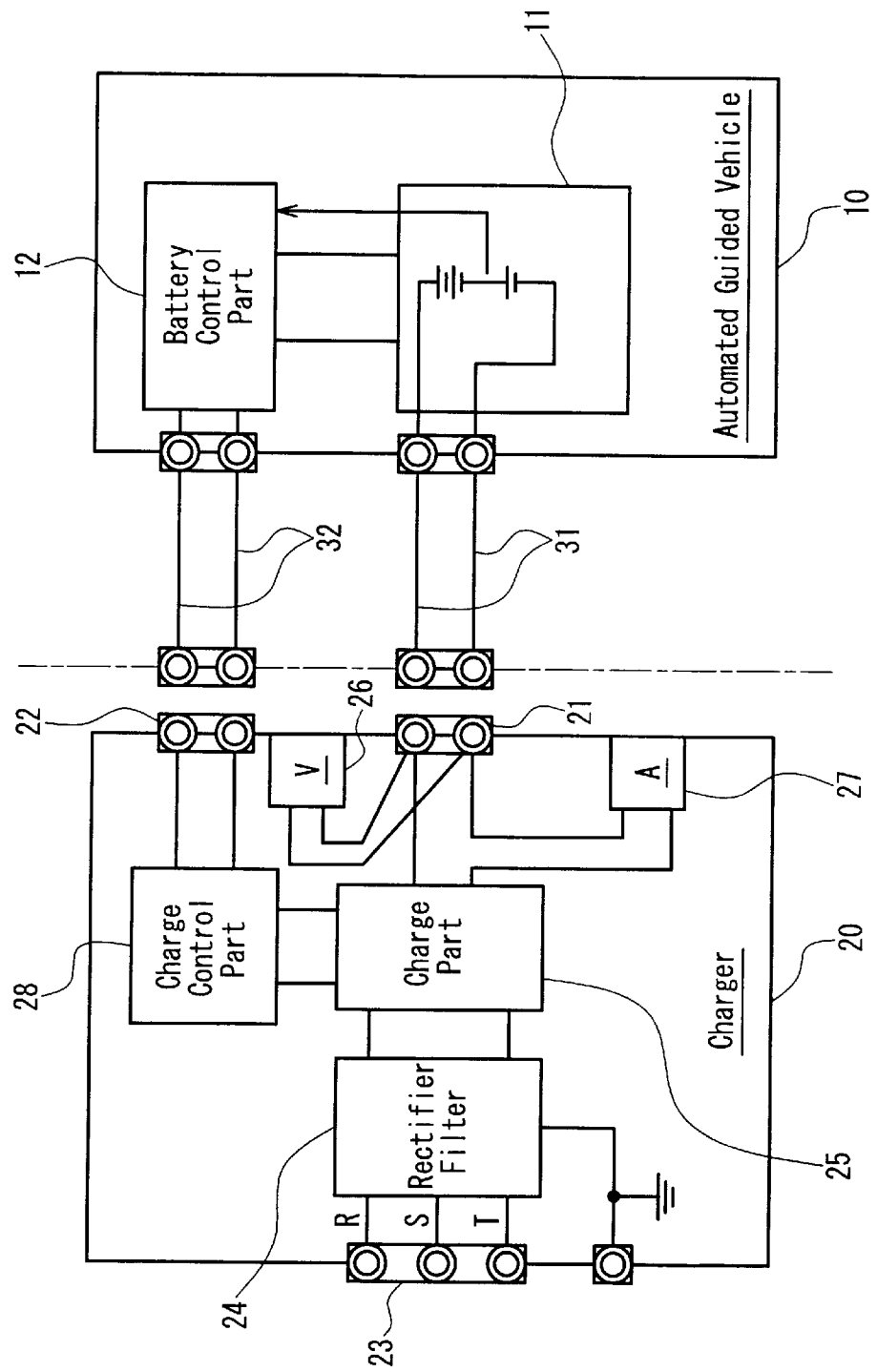
FIG. 1 is a diagram showing a configuration of a charge control system using a method for controlling charge to a secondary battery for an automated guided vehicle according to a first embodiment of the present invention.

FIG. 1 is a diagram showing a configuration of a charge control system using a method for controlling charge to a secondary battery for an automated guided vehicle according to a first embodiment of the present invention.

In FIG. 1, reference numeral 10 denotes an automated guided vehicle. On the automated guided vehicle 10, a battery 11 is mounted and a battery control part 12 for controlling the battery 11 is provided.

The battery 11 is configured of a plurality of cells made of a nickel-metal hydride secondary battery etc. connected in series to obtain an output necessary for driving of an electric motor for running or load (not shown in the drawing).

The battery control part 12 allows the supply of electric power from the battery 11 to the electric motor for running or load to start and terminate in response to a request for starting or a request for carrying indicated by an operation control station (not shown in the drawing), or allows the supply of electric power from the battery 11 to the electric motor for running or load to stop when the automated guided vehicle 10 moves toward the charge station (not shown in the drawing). It is connected electrically to the below-mentioned charger 20 via a charge line 31 and a charge control signal line 32, and transmits a temperature in the battery 11, which changes in response to charging electricity supplied via the charge line 31, as a charge control signal to the charger 20 via the charge control signal line 32.

In the charger 20, reference numeral 21 denotes a charge terminal to which the charge line 31 is connected; 22 denotes a control terminal to which the charge control signal line 32 is connected; and 23 denotes a power supply terminal to which an alternating-current power supply voltage is supplied. Reference numeral 24 denotes a rectifier filter for rectifying the alternating-current power supply voltage from the power supply terminal 23 to convert it into a direct-current power supply voltage; 25 denotes a charge part for supplying charging electricity to the battery 11 of the automated guided vehicle 10 based on the direct-current power supply from the rectifier filter 24.

Furthermore, reference numeral 26 denotes a voltage detection part for detecting the terminal voltage of the battery 11 connected to the charge terminal 21 via the charge line 31; 27 denotes a current detection part for detecting charging current to the battery 11; and 28 denotes a charge control part.

The charge control part 28 controls the charging operation with respect to the charge part 25 based on the charge control signal transmitted from the automated guided vehicle 10 via the charge control signal line 32 and the control terminal 22, a voltage signal from the voltage detection part 26 and a current signal from the current detection part 27. It also determines that the charging operation is completed and transmits the charge completion signal to the battery control part 12 of the automated guided vehicle 10 via the charge control signal line 32.

Next, a charge/discharge control process of a secondary battery of an automated guided vehicle in the charge control system configured as mentioned above will be explained with reference to FIG. 2.

Figure 2:
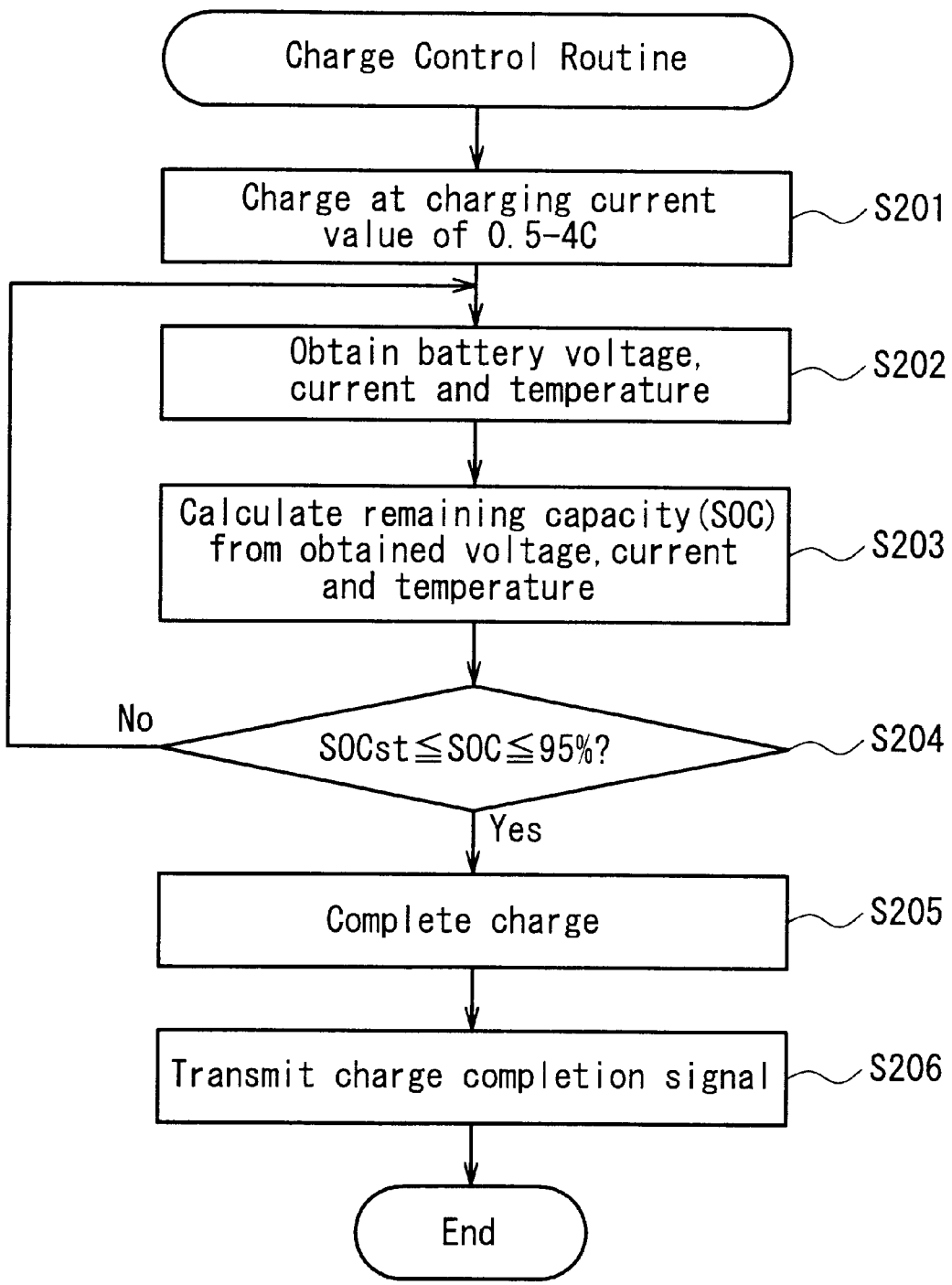
FIG. 2 is a flowchart showing a charge control routine in the method for controlling charge to a secondary battery for an automated guided vehicle according to the first embodiment of the present invention.

FIG. 2 is a flowchart showing a charge control routine to a secondary battery for an automated guided vehicle. When the automated guided vehicle 10 moves toward the charge station and is connected to the charger 20, a charge control routine shown in FIG. 2 starts.

In FIG. 2, first, the charge control part 28 of the charger 20 controls the charge part 25 so that the charging current value indicated by the current signal from the current detection part 27 becomes a pre-set value, that is, 0.5 C to 4 C, and charging of the battery 11 of the automated guided vehicle 10 is carried out (S201).

Next, the charge control part 28 obtains a voltage signal from the voltage detection part 26, a current signal from the current detection part 27 and a temperature signal from the battery control part 12 of the automated guided vehicle 10 via the charge control signal line 32 (S202); and calculates the current remaining capacity (SOC) based on the values of the voltage signal, current signal and temperature signal obtained in the step S202 (S203).

Next, the charge control part 28 determines whether the SOC calculated in the step S203 is not less than the predetermined threshold value SOCst (not less than 60%) and not more than 95% (S204). As a result of the determination, when the calculated SOC is less than the threshold value SOCst (No), the steps S202 through S204 are repeated while waiting for the increase of SOC.

On the other hand, when as a result of the determination in the step S204 the calculated SOC is not less than the threshold value SOCst (Yes), the charge control part 28 controls the charge part 25 to complete the charge to the battery 11 of the automated guided vehicle 10 (S205) and transmits the charge completion signal indicating that the charge is completed to the battery control part 12 (S206), and thus the charge control routine is finished.

Moreover, in this embodiment, the criterion for determining whether the charge is completed may include the case where the charging time reaches a predetermined period of time, the case where the battery temperature reaches a predetermined upper limit temperature, the case where the temperature gradient of the battery temperature with respect to the time is calculated and the calculated temperature gradient reaches a predetermined value, or the like, in addition to the case where value of the calculated SOC is not less than the threshold SOCst.

(Second Embodiment)

Figure 3:
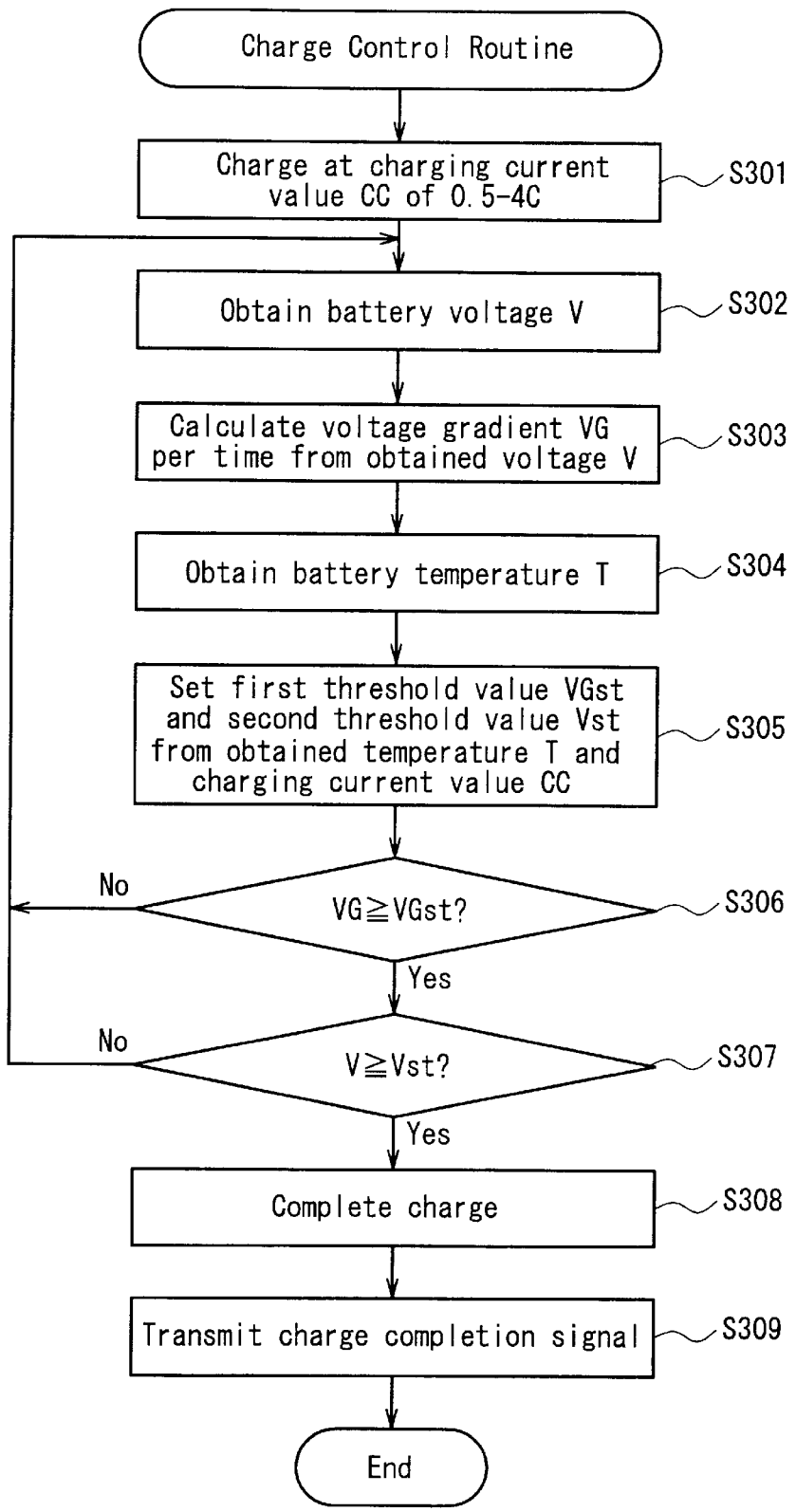
FIG. 3 is a flowchart showing a charge control routine in a method for controlling charge to a secondary battery for an automated guided vehicle according to a second embodiment of the present invention.

FIG. 3 is a flowchart showing a charge control routine in a method for controlling charge to a secondary battery of an automated guided vehicle according to a second embodiment of the present invention. Moreover, the system to which the method for controlling charge of this embodiment is applied is assumed to be the same as that in the first embodiment.

In FIG. 3, first, the charge control part 28 of the charger 20 controls the charge part 25 so that the charging current value indicated by the current signal from the current detection part 27 becomes a pre-set current value CC, that is, 0.5 C to 4 C and charging the battery 11 of the automated guided vehicle 10 is carried out (S301).

Next, the charge control part 28 obtains a voltage signal from the voltage detection part 26 (S302) and calculates a voltage gradient VG of the battery voltage V indicated by the obtained voltage signal per time (S303).

Next, the charge control part 28 obtains a temperature signal from the battery control part 12 of the automated guided vehicle 10 via the charge control signal line 32 (S304). Based on the first and second functional equations in which the battery temperature T indicated by the obtained temperature signal is a variable and the set charging current value CC is a parameter, a voltage gradient threshold value (first threshold value) VGst and a voltage threshold value (second threshold value) Vst are set (S305).

Figure 4:
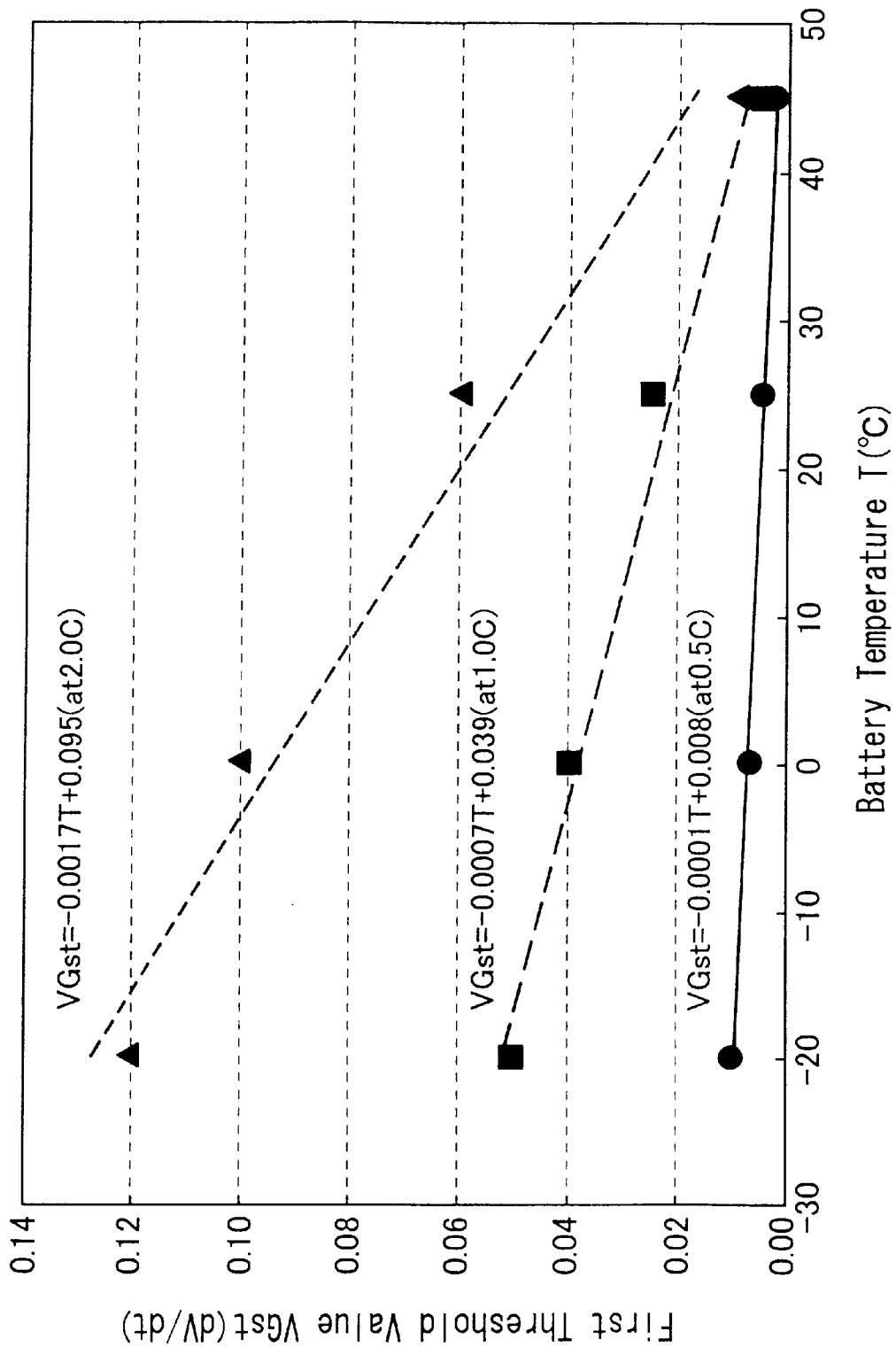
FIG. 4 is a graph showing a first functional equation of a voltage gradient threshold value (a first threshold value) VGst with respect to a battery temperature T.
Figure 5:
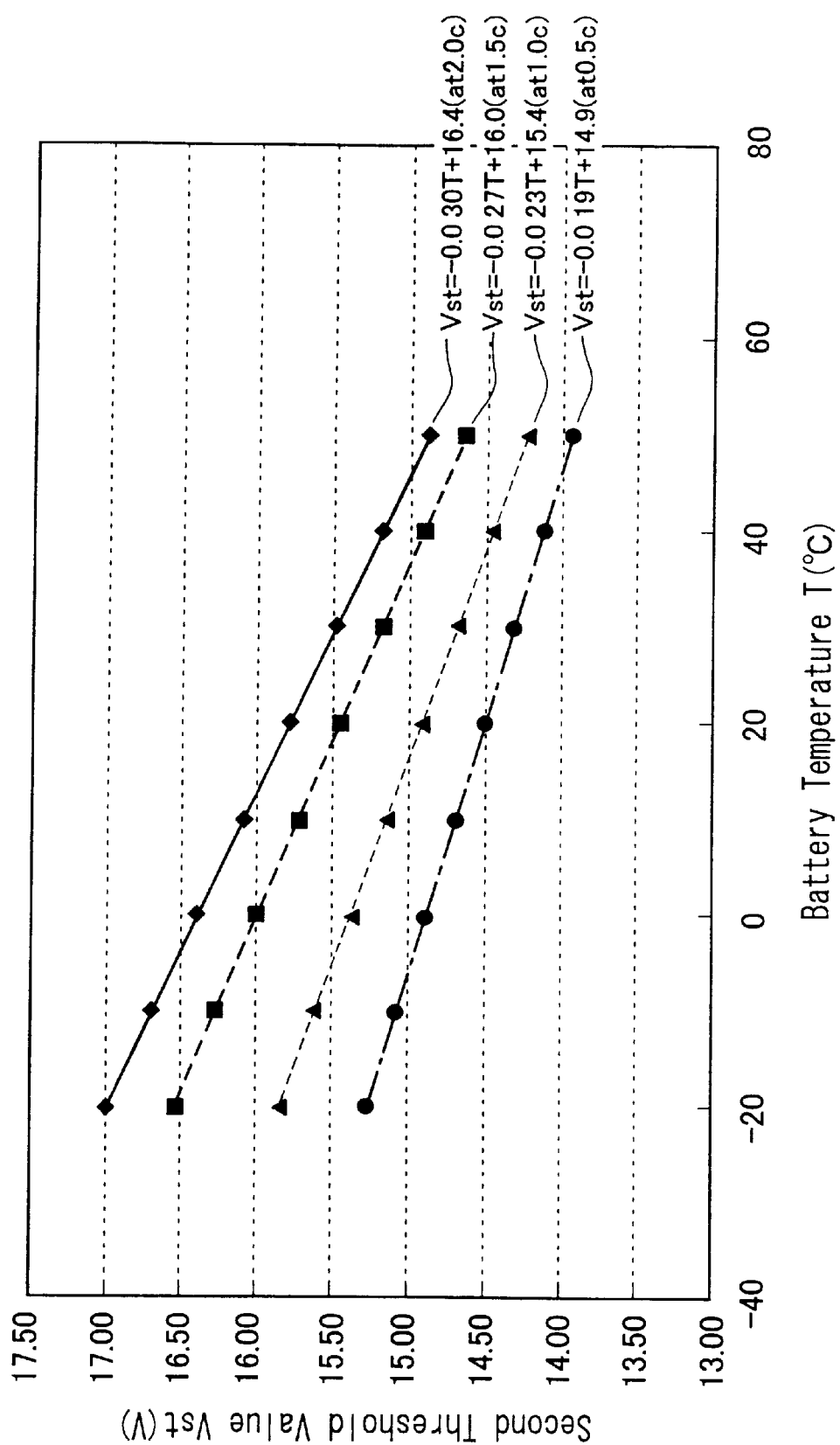
FIG. 5 is a graph showing a second functional equation of the voltage threshold value (a second threshold value) Vst with respect to a battery temperature T.

FIGS. 4 and 5 are graphs showing the first and second functional equations expressed respectively by a linear equation in which the battery temperature T is a variable and the charging current value CC (charging rate) is a parameter. Moreover, in FIG. 4, as the first functional equation, only the case where the charging current values CC are 0.5 C, 1.0 C and 2.0 C is shown as an example; and in FIG. 5, as the second functional equation, only the case where the charging current values CC are 0.5 C, 1.0 C, 1.5 C and 2.0 C is shown as an example. Actually, however, the charging current value CC may be not less than 2.0 C (not more than 4.0 C). Furthermore, the setting step between the charging current values CC is defined more precisely.

As shown in FIGS. 4 and 5, the first and second functional equations show that as the battery temperature T is lower and the charging current value CC as a parameter increases, the first threshold value VGst and the second threshold value Vst are increased. The first and second functional equations are determined in accordance with the intended set value of the SOC at the time the charge is completed (the functional equations shown in FIGS. 4 and 5 are determined so that the SOC at the time the charge is completed is about 70%) and stored as a table in, for example, a memory provided in the charge control part 28.

Moreover, in this embodiment, the first functional equation of the voltage gradient threshold value VGst with respect to the battery temperature T and the second functional equation of the voltage threshold value Vst with respect to the battery temperature T are expressed by a linear equation, respectively. However, the present invention is not necessarily limited to this, and other functional equations may be applied.

Referring back to FIG. 3, in the step S305, the first threshold value VGst is set based on the first functional equation shown in FIG. 4 and the second threshold value Vst is set based on the second functional equation shown in FIG. 5, and then it is determined whether the voltage gradient VG calculated in the step S303 is not less than the first threshold value VGst (S306). As a result of the determination in the step S306, when the voltage gradient VG is less than the first threshold value VGst (No), the steps S302 through S306 are repeated while waiting for the increase of the voltage gradient.

On the other hand, when as a result of the determination in the step S306 the voltage gradient VG is not less than the first threshold value VGst (Yes), it is determined whether the battery voltage V is not less than the second threshold value Vst (S307). When as a result of the determination in the step S307 the battery voltage V is less than the second threshold value Vst (No), the steps S302 through S307 are repeated while waiting for the increase of the battery voltage V.

When as a result of the determination in the step S307 after the steps S302 through S307 are repeated, the battery voltage V is not less than the second threshold value Vst (Yes), the charge control part 28 controls the charge part 25 and completes the charge with respect to the battery 11 of the automated guided vehicle 10 (S308), and transmits the charge completion signal indicating that the charge is completed to the battery control part 12 (S309). Thus, the charge control routine is finished.

Figure 6:
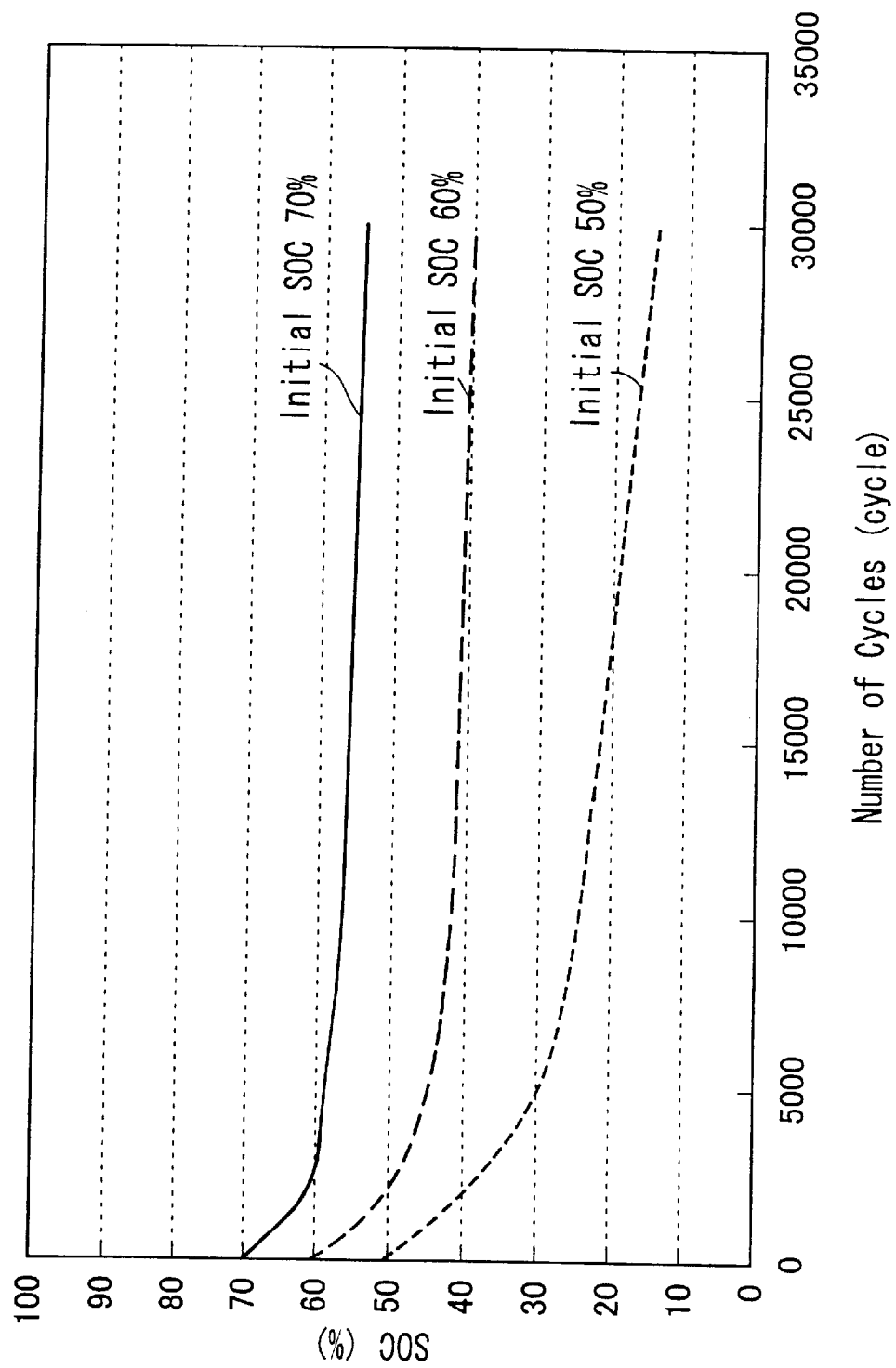
FIG. 6 is a graph showing the change in SOC with respect to the number of cycles when a cycle charge/discharge is carried out with the initial SOC set to 70%, 60% and 50%.
Figure 7:
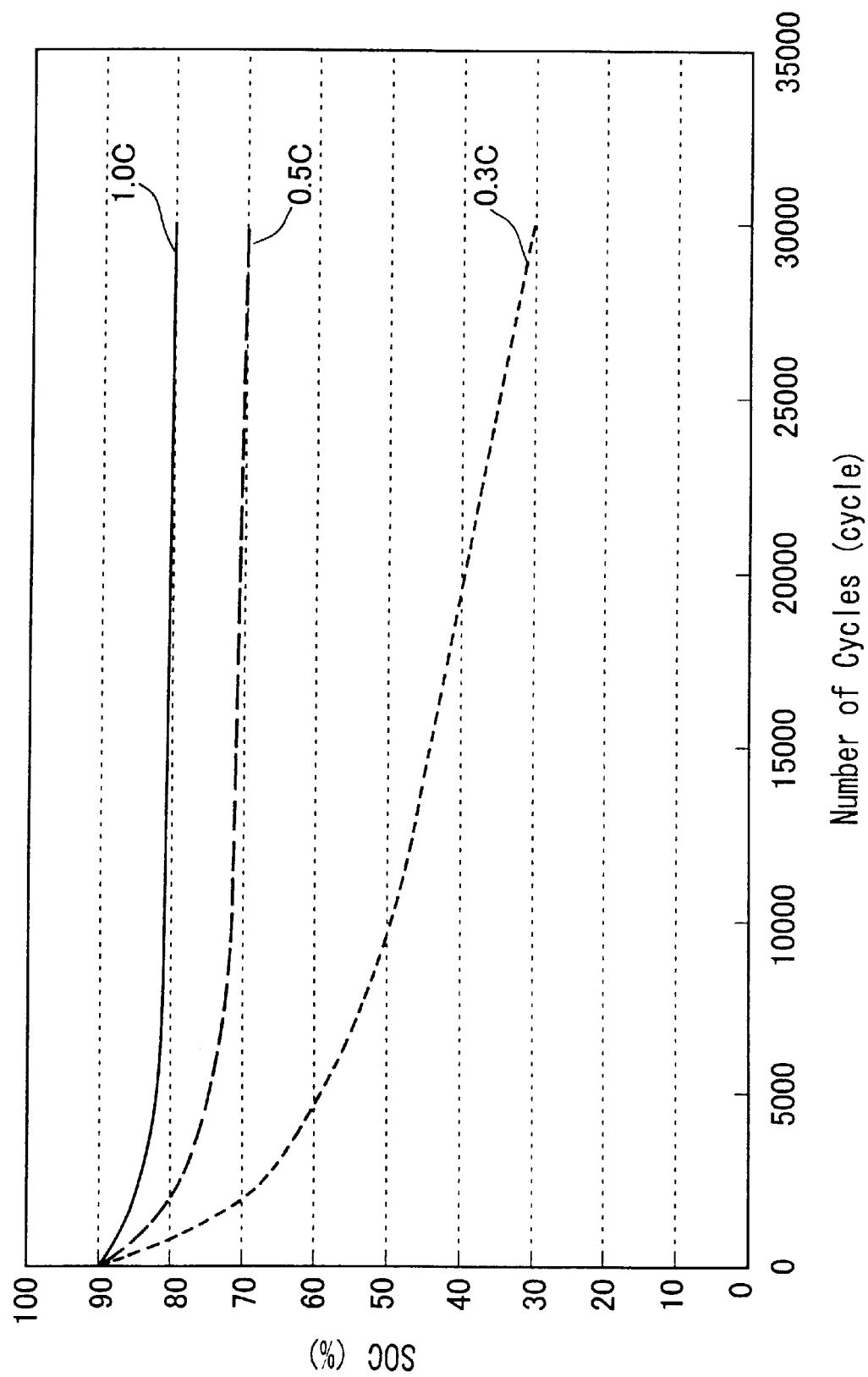
FIG. 7 is a graph showing the change in SOC with respect to the number of cycles when a cycle charge/discharge is carried out at the charging rate of 1.0 C, 0.5 C and 0.3 C with the initial SOC set to 90%.
Figure 8:
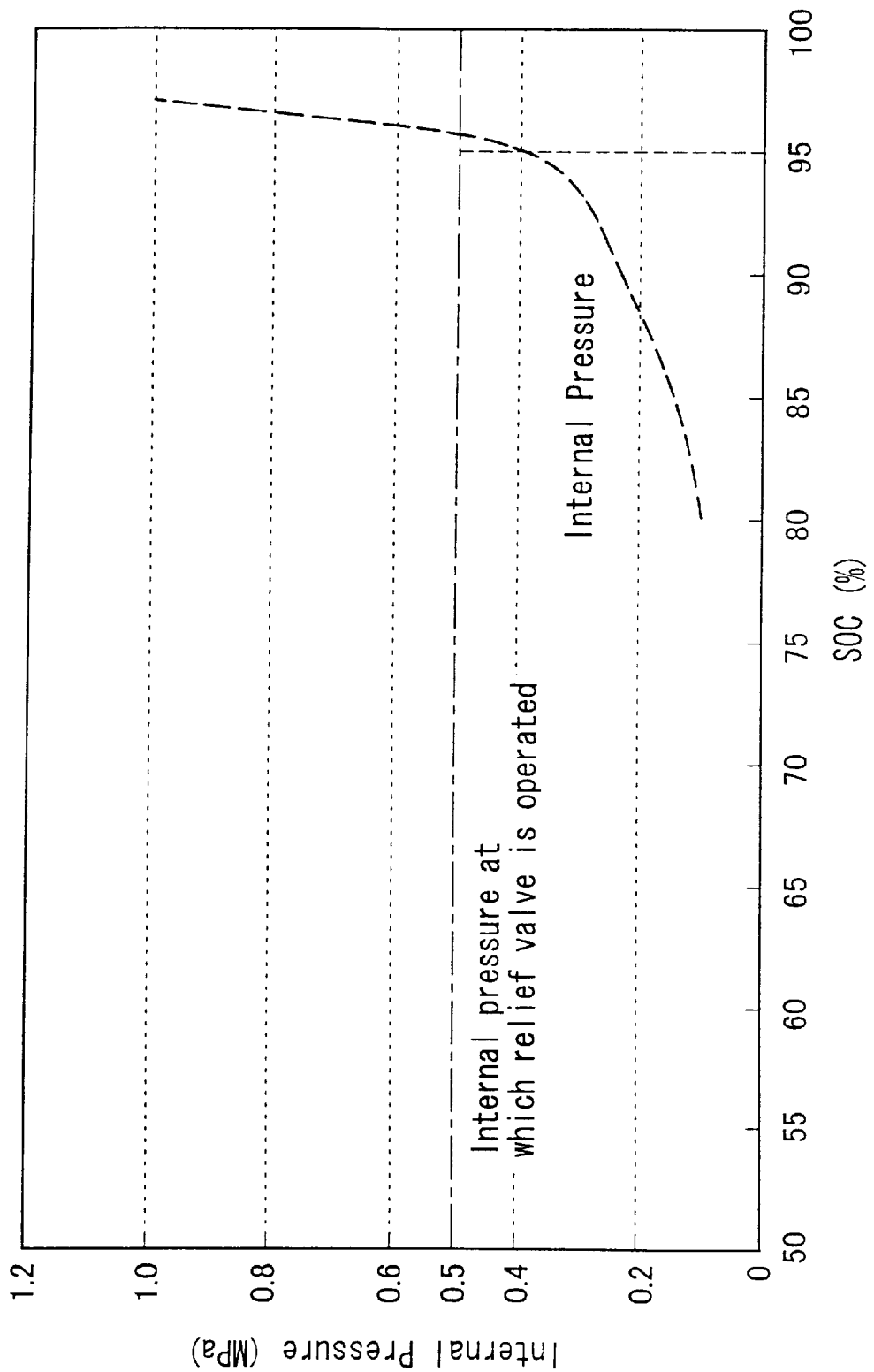
FIG. 8 is a graph showing the relationship between the SOC and the internal pressure of a battery during charging.

Next, advantages of the embodiments of the present invention will be explained with reference to FIGS. 6, 7 and 8 showing specific experimental data.

FIG. 6 is a graph showing the change in SOC with respect to the number of cycles when a cycle charge/discharge is carried out with the initial SOC set to 70%, 60% and 50%, respectively. Moreover, as the conditions for charging/discharging cycle in FIG. 6, the charging rate is set to 2.0 C and the discharging rate is set to 0.2 C.

Furthermore, FIG. 7 is a graph showing the change in SOC with respect to the number of cycles when a cycle charge/discharge is carried out at the charging rate of 1.0 C, 0.5 C and 0.3 C with the initial SOC set to 90%. Moreover, the discharging rate in charging/discharging cycle in FIG. 7 is set to 0.2 C as in FIG. 6.

As shown in FIGS. 6 and 7, when the cycle charge/discharge is carried out with the initial SOC of less than 60% and the charging rate of less than 0.5 C, since the SOC displaces toward the lower area due to the memory effect during charging, the predetermined lower limit voltage is reached immediately. Therefore, it is necessary to carry out a refresh charge and discharge frequently. However, if the initial SOC is not less than 60% and the charging rate is not less than 0.5 C, the reduction of the SOC due to the memory effect during charging is suppressed. Consequently, the battery can be used at an extremely stable SOC.

FIG. 8 is a graph showing a relationship between the SOC and the battery internal pressure when the charge is carried out at the charging rate of 4.0 C. As shown in FIG. 8, by completing the charge at the SOC of not more than 95%, it is possible to make the battery internal pressure to be less than 0.5 MPa, at which a relief valve is operated. Thus, problems such as gas leakage etc. can be prevented.

As mentioned above, the present invention can provide a specific effect in that it is possible to prevent the operation of the valve and to suppress the memory effect at the charging side in the secondary battery mounted on the automated guided vehicle.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for controlling charge to a secondary battery for an automated guided vehicle, the method controlling a charge amount of the secondary battery mounted on the automated guided vehicle and used as a power source of an electric motor for running, the method comprising:

charging the secondary battery at a charging current value of not less than 0.5 C and not more than 4.0 C;

detecting current that flows in the secondary battery and calculating the remaining capacity by accumulating at least the detected current;

completing the charge to the secondary battery when the calculated remaining capacity is not less than a threshold value, which is pre-set to not less than 60%, and not more than 95%;

detecting a temperature of the secondary battery;

detecting an output voltage of the secondary battery;

calculating a voltage gradient of the detected output voltage with respect to the time; and completing the charge to the secondary battery when, excluding the time right after the charge is started, the calculated voltage gradient is not less than a first threshold value corresponding to the detected temperature and the detected output voltage is not less than a second threshold value corresponding to the detected temperature.

2. The method for controlling charge to a secondary battery for an automated guided vehicle according to claim 1, wherein the first threshold value and second threshold value are expressed by a first functional equation and a second functional equation having variables of the detected temperature, respectively, and the first and second functional equations are determined in accordance with the intended set value of the remaining capacity at the time the charge is completed.

3. The method for controlling charge to a secondary battery for an automated guided vehicle according to claim 2, wherein the first and second functional equations are determined respectively so that the first and second threshold values are reduced as the detected temperature is higher.

4. The method for controlling charge to a secondary battery for an automated guided vehicle according to claim 2, wherein the first and second functional equations are determined in accordance with the charging current value.

5. The method for controlling charge to a secondary battery for an automated guided vehicle according to claim 4, wherein the first and second functional equations are determined so that the first and second threshold values are increased as the charging current value is larger.

6. The method for controlling charge to a secondary battery for an automated guided vehicle according to claim 2, wherein the first and second functional equations are expressed respectively by a linear equation.

* * * * *